(12) United States Patent
Shim et al.

(10) Patent No.: US 9,360,085 B2
(45) Date of Patent: Jun. 7, 2016

(54) GEAR TRAIN OF AUTOMATIC TRANSMISSION FOR VEHICLE

(71) Applicant: Hyundai Motor Company, Seoul (KR)

(72) Inventors: Hyu Tae Shim, Hwaseong-si (KR);
Kangsoo Seo, Yongin-si (KR); Jaeyoung Jeon, Osan-si (KR); Sang Bum Baek, Seoul (KR); Sung Hoon Park, Seongnam (KR); Myeong Hoon Noh, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 14/302,211

(22) Filed: Jun. 11, 2014

(65) Prior Publication Data

US 2015/0111686 A1    Apr. 23, 2015

(30) Foreign Application Priority Data

Oct. 22, 2013    (KR) ........................ 10-2013-0125888

(51) Int. Cl.
*F16H 3/62* (2006.01)
*F16H 3/44* (2006.01)
*F16H 37/06* (2006.01)
*F16H 3/66* (2006.01)

(52) U.S. Cl.
CPC .. *F16H 3/62* (2013.01); *F16H 3/66* (2013.01); *F16H 2200/006* (2013.01); *F16H 2200/0086* (2013.01); *F16H 2200/201* (2013.01); *F16H 2200/2046* (2013.01); *F16H 2200/2066* (2013.01); *F16H 2200/2082* (2013.01); *F16H 2200/2097* (2013.01)

(58) Field of Classification Search
CPC ................... F16H 2200/201; F16H 2200/2097
See application file for complete search history.

(56) References Cited

U.S. PATENT DOCUMENTS

| 7,252,617 | B2 * | 8/2007 | Shim ....................... F16H 3/663 475/275 |
| 8,414,444 | B2 | 4/2013 | Seo et al. |
| 2008/0146392 | A1 * | 6/2008 | Shim ....................... F16H 3/666 475/43 |
| 2008/0242482 | A1 * | 10/2008 | Phillips .................... F16H 3/66 475/276 |
| 2008/0261754 | A1 * | 10/2008 | Phillips .................... F16H 3/66 475/276 |
| 2008/0261755 | A1 * | 10/2008 | Phillips .................... F16H 3/66 475/276 |

FOREIGN PATENT DOCUMENTS

| JP | 2008-208964 A | 9/2008 |
| JP | 2009-162339 A | 7/2009 |

* cited by examiner

*Primary Examiner* — Tisha Lewis
(74) *Attorney, Agent, or Firm* — Morgan, Lewis & Bockius LLP (57) ABSTRACT

A gear train may include an input shaft adapted to receive torque of an engine, an output shaft adapted to output changed torque, a first planetary gear set including a first sun gear, a first planet carrier, and a first ring gear as rotation elements thereof, a second planetary gear set including a second sun gear, a second planet carrier, and a second ring gear as rotation elements thereof, and a third planetary gear set including a third sun gear, a third planet carrier, and a third ring gear as rotation elements thereof.

17 Claims, 3 Drawing Sheets

| shift-speed | C1 | C2 | C3 | C4 | B1 | B2 | F | gear ratio |
|---|---|---|---|---|---|---|---|---|
| D1 | ● | | | | ● | | ○ | 4.771 |
| D2 | ● | | | | | ● | | 2.802 |
| D3 | ● | ● | | | | | | 1.731 |
| D4 | ● | | | ● | | | | 1.353 |
| D5 | ● | | ● | | | | | 1.181 |
| D6 | | | ● | ● | | | | 1.000 |
| D7 | | ● | ● | | | | | 0.813 |
| D8 | | | ● | | | ● | | 0.648 |
| REV1 | | ● | | | ● | | | -3.181 |
| REV2 | | | | ● | ● | | | -1.838 |

FIG. 3

GEAR TRAIN OF AUTOMATIC TRANSMISSION FOR VEHICLE

CROSS-REFERENCE TO RELATED APPLICATION

The present application claims priority to Korean Patent Application No. 10-2013-0125888 filed on Oct. 22, 2013, the entire contents of which is incorporated herein for all purposes by this reference.

BACKGROUND OF THE INVENTION

1. Field of the Invention

The present invention relates to an automatic transmission for a vehicle. More particularly, the present invention relates to a gear train of an automatic transmission for a vehicle which improves power delivery performance and reduces fuel consumption.

2. Description of Related Art

Typically, a gear train of an automatic transmission is realized by combining a plurality of planetary gear sets, and the gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the gear train that is able to realize more shift speeds is under continuous investigation.

Though achieving the same number of speeds, the gear train has a different operating mechanism according to a connection between rotation elements (i.e., sun gear, planet carrier, and ring gear). In addition, the gear train has different features such a durability, power delivery efficiency, and size depend on the layout thereof.

Therefore, designs for a combining structure of a gear train are also under continuous investigation.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and ten-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a gear train of an automatic transmission for a vehicle having advantages of simplifying a layout of the automatic transmission and improving power delivery performance and fuel economy as a consequence of achieving eight forward speeds and two reverse speeds by combining three planetary gear sets and six friction members.

In an aspect of the present invention, a gear train apparatus of an automatic transmission for a vehicle may include an input shaft receiving a torque of an engine, an output shaft outputting a changed torque, a first planetary gear set including first, second, and third rotation elements and disposed on the input shaft, a second planetary gear set including fourth, fifth, and sixth rotation elements and disposed on the input shaft, a third planetary gear set including seventh, eighth, and ninth rotation elements and disposed on the input shaft, a first rotation shaft directly connecting the first rotation element with a transmission housing, a second rotation shaft directly connecting the third rotation element with the fourth rotation element, a third rotation shaft directly connecting the second rotation element with the input shaft, a fourth rotation shaft directly connecting the ninth rotation element with the output shaft, a fifth rotation shaft directly connecting the fifth rotation element with the eighth rotation element and selectively connected to the input shaft or the transmission housing, a sixth rotation shaft connected to the sixth rotation element, and a seventh rotation shaft connected to the seventh rotation element, and selectively connected to the second rotation shaft, the third rotation shaft, the sixth rotation shaft, or the transmission housing.

The first planetary gear set is a double pinion planetary gear set, wherein the first rotation element is a first sun gear, the second rotation element is a first planet carrier, and the third rotation element is a first ring gear.

The second planetary gear set is a single pinion planetary gear set, wherein the fourth rotation element is a second sun gear, the fifth rotation element is a second planet carrier, and the sixth rotation element is a second ring gear.

The third planetary gear set is a single pinion planetary gear set, wherein the seventh rotation element is a third sun gear, the eighth rotation element is a third planet carrier, and the ninth rotation element is a third ring gear.

The gear train apparatus may further include a first clutch selectively connecting the sixth rotation shaft with the seventh rotation shaft, a second clutch selectively connecting the second rotation shaft with the seventh rotation shaft, a third clutch selectively connecting the fifth rotation shaft with the input shaft, a fourth clutch selectively connecting the third rotation shaft with the seventh rotation shaft, a first brake selectively connecting the fifth rotation shaft with the transmission housing, and a second brake selectively connecting the seventh rotation shaft with the transmission housing.

The first clutch is disposed between the second and third planetary gear sets, the first and second brakes are disposed at a radial outside of the first clutch, the second and fourth clutches are disposed at a radial outside of the first planetary gear set, and the third clutch is disposed between the third planetary gear set and the output shaft.

The gear train may further include a one-way clutch disposed in parallel with the first brake.

The first clutch and the first brake are operated at a first forward speed, the first clutch and the second brake are operated at a second forward speed, the first clutch and the second clutch are operated at a third forward speed, the first clutch and the fourth clutch are operated at a fourth forward speed, the first clutch and the third clutch are operated at a fifth forward speed, the third clutch and the fourth clutch are operated at a sixth forward speed, the second clutch and the third clutch are operated at a seventh forward speed, the third clutch and the second brake are operated at an eighth forward speed, the second clutch and the first brake are operated at a first reverse speed, and the fourth clutch and the first brake are operated at a second reverse speed.

In another aspect of the present invention, a gear train apparatus of an automatic transmission for a vehicle may include an input shaft receiving a torque of an engine, an output shaft outputting a changed torque, a first planetary gear set including a first sun gear, a first planet carrier, and a first ring gear as rotation elements thereof, a second planetary gear set including a second sun gear, a second planet carrier, and a second ring gear as rotation elements thereof, and a third planetary gear set including a third sun gear, a third planet carrier, and a third ring gear as rotation elements thereof, wherein the first sun gear is directly connected to a transmission housing, the first ring gear is directly connected to the second sun gear, the first planet carrier is directly connected to the input shaft, the third ring gear is directly connected to the output shaft, and the second planet carrier is directly connected to the third planet carrier, wherein the third sun gear is selectively connected to the second ring gear, both of the second sun gear and the first ring gear that are directly connected to each other, the first planet carrier, or the transmission housing, and wherein the third planet carrier is selectively connected to the input shaft or the transmission housing.

The first planetary gear set is a double pinion planetary gear set and each of the second and third planetary gear sets is a single pinion planetary gear set.

A first clutch selectively connecting the third sun gear with the second ring gear, a second clutch selectively connecting the third sun gear with both of the second sun gear and the first ring gear that are directly connected to each other, a third clutch selectively connecting the third planet carrier with the input shaft, a fourth clutch selectively connecting the third sun gear with the first planet carrier, a first brake selectively connecting the third planet carrier with the transmission housing, and a second brake selectively connecting the third sun gear with the transmission housing.

The first clutch is disposed between the second and third planetary gear sets, the first and second brakes are disposed at a radial outside of the first clutch, the second and fourth clutches are disposed at a radial outside of the first planetary gear set, and the third clutch is disposed between the third planetary gear set and the output shaft.

The gear train apparatus may further include a one-way clutch disposed in parallel with the first brake.

The first clutch and the first brake are operated at a first forward speed, the first clutch and the second brake are operated at a second forward speed, the first clutch and the second clutch are operated at a third forward speed, the first clutch and the fourth clutch are operated at a fourth forward speed, the first clutch and the third clutch are operated at a fifth forward speed, the third clutch and the fourth clutch are operated at a sixth forward speed, the second clutch and the third clutch are operated at a seventh forward speed, the third clutch and the second brake are operated at an eighth forward speed, the second clutch and the first brake are operated at a first reverse speed, and the fourth clutch and the first brake are operated at a second reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
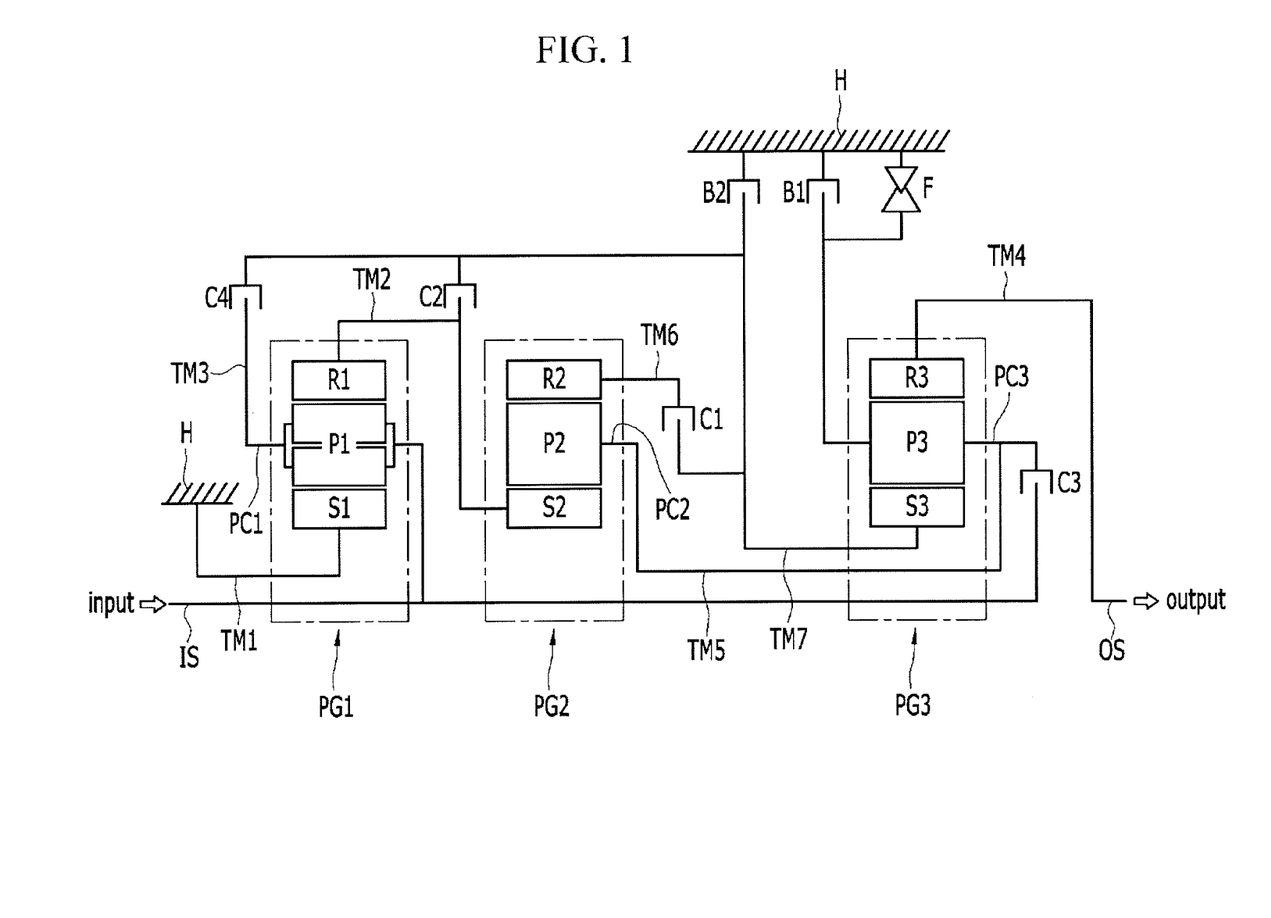
FIG. 1 is a schematic diagram of a gear train of an automatic transmission according to an exemplary embodiment of the present invention.

FIG. 1 is a schematic diagram of a gear train of an automatic transmission according to an exemplary embodiment of the present invention.

Referring to FIG. 1, a gear train according to an exemplary embodiment of the present invention includes an input shaft IS receiving torque of an engine and an output shaft OS outputting changed torque.

In addition, the gear train further includes first, second, and third planetary gear sets PG1, PG2, and PG3 disposed on the input shaft IS, seven rotation shafts TM1, TM2, TM3, TM4, TM5, TM6, and TM7 connecting rotation elements of the first, second, and third planetary gear sets PG1, PG2, and PG3 directly or selectively, and six friction members.

Therefore, the torque input from the input shaft IS is changed by the first, second, and third planetary gear sets PG1, PG2, and PG3 and is then output through the output shaft OS.

In addition, the planetary gear sets are disposed in a sequence of the first, second, and third planetary gear sets PG1, PG2, and PG3 from an engine to the rear thereof.

The input shaft IS is an input member and receives the torque of the engine. A torque converter may be disposed between the input shaft IS and the engine.

The output shaft OS is an output member and transmits driving torque to a driving wheel through a differential apparatus and an output gear.

The first planetary gear set PG1 is a double pinion planetary gear set and includes a first sun gear S1 that is a first rotation element, a first planet carrier PC1 that is a second rotation element and rotatably supports a first pinion P1 disposed at a radially outer portion of the first sun gear S1 and engaging with the first sun gear S1, and a first ring gear R1 that is a third rotation element, disposed at a radially outer portion of the first pinion P1, and engaging with the first pinion P1 as rotation elements thereof.

The second planetary gear set PG2 is a single pinion planetary gear set and includes a second sun gear S2 that is a fourth rotation element, a second planet carrier PC2 that is a fifth rotation element and rotatably supports a second pinion P2 disposed at a radially outer portion of the second sun gear S2 and engaging with the second sun gear S2, and a second ring gear R2 that is a sixth rotation element, disposed at a radially outer portion of the second pinion P2, and engaging with the second pinion P2 as rotation elements thereof.

The third planetary gear set PG3 is a single pinion planetary gear set and includes a third sun gear S3 that is a seventh rotation element, a third planet carrier PC3 that is an eighth rotation element and rotatably supports a third pinion P3 disposed at a radially outer portion of the third sun gear S3 and engaging with the third sun gear S3, and a third ring gear R3 that is a ninth rotation element, disposed at a radially outer portion of the third pinion P3, and engaging with the second pinion P3 as rotation elements thereof.

In addition, the first ring gear R1 is directly connected to the second sun gear S2, and the first planetary gear set PG1 is connected to the first, second, and third rotation shafts TM1, TM2, and TM3.

In addition, the second and third planet carriers PC2 and PC3 are directly connected to each other, and the second planetary gear set PG2 is connected to the second, fifth, and sixth rotation shafts TM2, TM5, and TM6.

In addition, the third planetary gear set PG3 is connected to the fourth, fifth, and seventh rotation shafts TM4, TM5, and TM7.

That is, the first rotation shaft TM1 directly connects the first sun gear S1 with a transmission housing H such that the first sun gear S1 is always operated as a fixed element.

The second rotation shaft TM2 directly connects the first ring gear R1 with the second sun gear S2 and always outputs a reduced rotation speed that is slower than a rotation speed of the input shaft IS.

The third rotation shaft TM3 directly connects the first planet carrier PC1 with the input shaft IS such that the first planet carrier PC1 is always operated as an input element.

The fourth rotation shaft TM4 directly connects the third ring gear R3 with the output shaft OS so as to output the changed torque finally.

The fifth rotation shaft TM5 directly connects the second planet carrier PC2 with the third planet carrier PC3, is selectively connected to the input shaft IS so as to selectively operate the second planet carrier PC2 and the third planet carrier PC3 as input elements, and is selectively connected to the transmission housing H so as to operate the second planet carrier PC2 and the third planet carrier PC3 as fixed elements.

The sixth rotation shaft TM6 is connected to the second ring gear R2.

The seventh rotation shaft TM7 is selectively connected to the second rotation shaft TM2, the third rotation shaft TM3 or the sixth rotation shaft TM6, or is selectively connected to the transmission housing H in a state of being connected to the third sun gear S3.

In addition, the six friction members includes first, second, third, and fourth clutches C1, C2, C3, and C4 selectively connecting the rotation shafts and first and second brakes B1 and B2 selectively connecting the rotation shafts to the transmission housing H.

The first clutch C1 selectively connects the sixth rotation shaft TM6 with the seventh rotation shaft TM7.

The second clutch C2 selectively connects the second rotation shaft TM2 with the seventh rotation shaft TM7.

The third clutch C3 selectively connects the fifth rotation shaft TM5 with the input shaft IS.

The fourth clutch C4 selectively connects the third rotation shaft TM3 with the seventh rotation shaft TM7.

The first brake B1 selectively connects the fifth rotation shaft TM5 with the transmission housing H.

The second brake B2 selectively connects the seventh rotation shaft TM7 with the transmission housing H.

The first clutch C1 is disposed between the second and third planetary gear sets PG2 and PG3, the first and second brakes B1 and B2 are disposed at a radial outside of the first clutch C1, the second and fourth clutches C2 and C4 are disposed at a radial outside of the first planetary gear set PG1, and the third clutch C3 is disposed between the third planetary gear set PG3 and the output shaft OS.

The gear train further includes a one-way clutch F disposed in parallel with the first brake B1, and the one-way clutch F1 is operated at a normal driving condition instead of the first brake B1.

Each clutch is a friction member selectively connecting one rotation member to another rotation member, and each brake is a friction member connecting a rotation member to a non-rotating member (fixed member).

If the clutch is operated, rotation shafts connected to each other are operated as one rotation member, and if the brake is operated, a rotation shaft connected to the transmission housing H is operated as a non-rotation member.

In addition, the friction members including the first, second, third, and fourth clutches C1, C2, C3, and C4 and the first and second brakes B1 and B2 are conventional multi-plate friction elements of wet type that are operated by hydraulic pressure.

Figure 2:
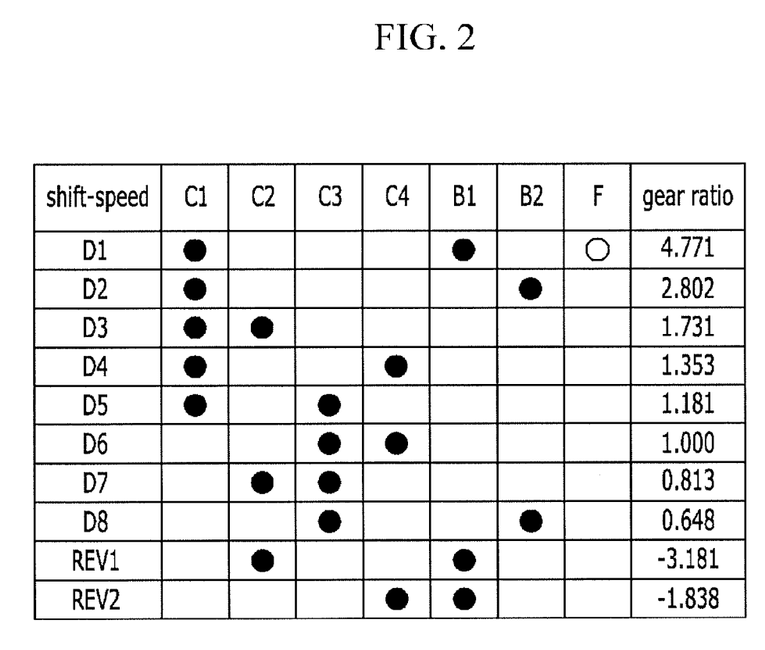
FIG. 2 is an operational chart of friction members at each shift-speed applied to a gear train according to an exemplary embodiment of the present invention.

FIG. 2 is an operational chart of friction members at each shift-speed applied to a gear train according to an exemplary embodiment of the present invention. According to an exemplary embodiment of the present invention, two friction members among the six friction members are operated at each shift-speed and eight forward speeds and two reverse speeds are achieved.

Referring to FIG. 2, operations of the friction members at each shift-speed are as follows.

The first clutch C1 and the first brake B1 are operated at a first forward speed D1.

The first clutch C1 and the second brake B2 are operated at a second forward speed D2.

The first clutch C1 and the second clutch C2 are operated at a third forward speed D3.

The first clutch C1 and the fourth clutch C4 are operated at a fourth forward speed D4.

The first clutch C1 and the third clutch C3 are operated at a fifth forward speed D5.

The third clutch C3 and the fourth clutch C4 are operated at a sixth forward speed D6.

The second clutch C2 and the third clutch C3 are operated at a seventh forward speed D7.

The third clutch C3 and the second brake B2 are operated at an eighth forward speed D8.

The second clutch C2 and the first brake B1 are operated at a first reverse speed REV1.

The fourth clutch C4 and the first brake B1 are operated at a second reverse speed REV2.

It is described that the first clutch C1 and the first brake B1 are operated at the first forward speed D1, but the one-way clutch F instead of the first brake B1 may be operated at the normal driving condition.

Figure 3:
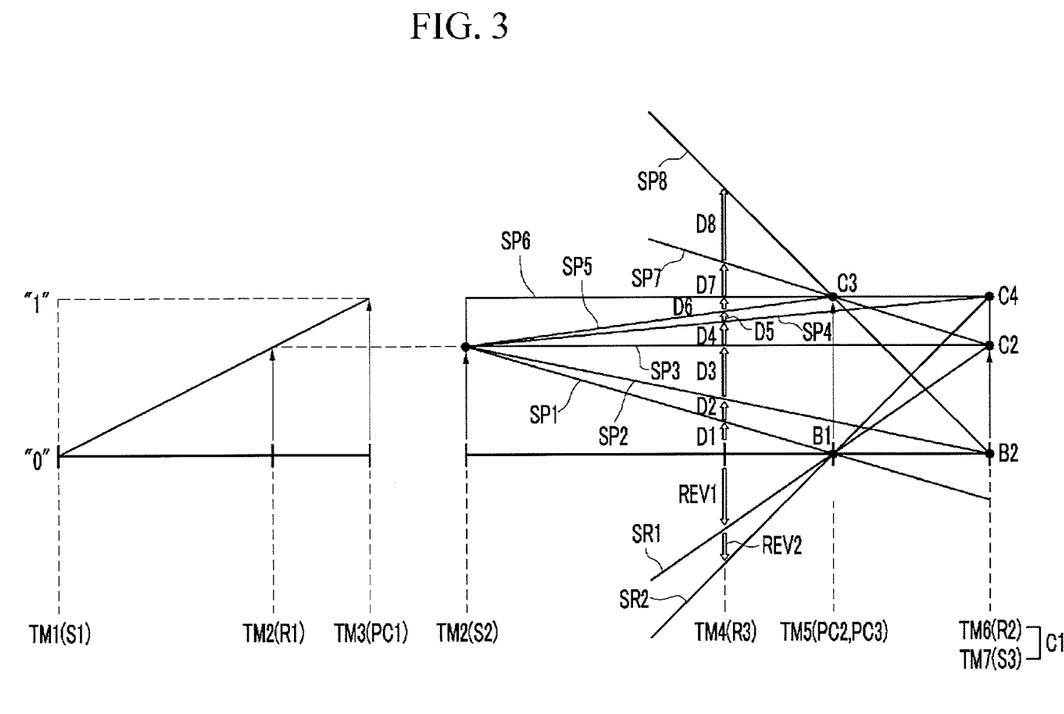
FIG. 3 is a lever diagram for a gear train according to an exemplary embodiment of the present invention.

FIG. 3 is a lever diagram for a gear train according to an exemplary embodiment of the present invention.

Referring to FIG. 3, a lower horizontal line represents a rotation speed is "0", and an upper horizontal line represents a rotation speed is "1.0", that is the rotation speed thereof is the same as that of the input shaft IS.

Three vertical lines of the first planetary gear set PG1 sequentially represent the first, second, and third rotation shafts TM1, TM2, and TM3 from the left to the right.

Herein, distances between the first, second, and third rotation shafts TM1, TM2, and TM3 are set according to gear ratios (teeth number of the sun gear/teeth number of the ring gear) of the first planetary gear set PG1.

Four vertical lines of the second and third planetary gear sets PG2 and PG3 sequentially represent the second, fourth, fifth, and sixth (or seventh) rotation shafts TM2, TM4, TM5, and TM6 or TM7 from the left to the right.

Herein, distances between the second, fourth, fifth, and sixth (or seventh) rotation shafts TM2, TM4, TM5, and TM6 or TM7 are set according to gear ratios (teeth number of the sun gear/teeth number of the ring gear) of the second and third planetary gear sets PG2 and PG3.

Since the lever diagram is well known to a person of an ordinary skill in the art designing a gear train, a detailed description thereof will be omitted.

Referring to FIG. 2 and FIG. 3, shifting processes for each shift-speed in the planetary gear train according to the present exemplary embodiment will be described.

[First Forward Speed]

The first clutch C1 and the first brake B1 (or the one-way clutch F) are operated at the first forward speed D1.

In a state that the rotation speed of the input shaft IS is input to the third rotation shaft TM3 of the first planetary gear set PG1, the first rotation shaft TM1 is operated as the fixed element. Therefore, the reduced rotation speed is output through the second rotation shaft TM2.

At this time, the second and third planet carriers PC2 and PC3 are directly connected to each other and the second ring gear R2 is connected to the third sun gear S3 by operation of the first clutch C1.

At this state, the reduced rotation speed is output from the second rotation shaft TM2 and the fifth rotation shaft TM5 is operated as the fixed element by operation of the first brake B1 or the one-way clutch F. Therefore, the rotation elements of the second and third planetary gear sets PG2 and PG3 form a first shift line SP1.

Therefore, D1 where the first shift line SP1 and the fourth rotation shaft TM4 that is the output element cross is output.

[Second Forward Speed]

The first brake B1 that was operated at the first forward speed D1 is released and the second brake B2 is operated at the second forward speed D2.

In a state that the rotation speed of the input shaft IS is input to the third rotation shaft TM3 of the first planetary gear set PG1, the first rotation shaft TM1 is operated as the fixed element. Therefore, the reduced rotation speed is output through the second rotation shaft TM2.

At this time, the second and third planet carriers PC2 and PC3 are directly connected to each other and the second ring gear R2 is connected to the third sun gear S3 by operation of the first clutch C1.

At this state, the reduced rotation speed is output from the second rotation shaft TM2 and the seventh rotation shaft TM7 is operated as the fixed element by operation of the second brake B2. Therefore, the rotation elements of the second and third planetary gear sets PG2 and PG3 form a second shift line SP2.

Therefore, D2 where the second shift line SP2 and the fourth rotation shaft TM4 that is the output element cross is output.

[Third Forward Speed]

The second brake B2 that was operated at the second forward speed D2 is released and the second clutch C2 is operated at the third forward speed D3.

In a state that the rotation speed of the input shaft IS is input to the third rotation shaft TM3 of the first planetary gear set PG1, the first rotation shaft TM1 is operated as the fixed element. Therefore, the reduced rotation speed is output through the second rotation shaft TM2.

At this time, the second and third planet carriers PC2 and PC3 are directly connected to each other and the second ring gear R2 is connected to the third sun gear S3 by operation of the first clutch C1.

At this state, the reduced rotation speed of the second rotation shaft TM2 is input to the seventh rotation shaft TM7 by operation of the second clutch C2. Therefore, the rotation elements of the second and third planetary gear sets PG2 and PG3 form a third shift line SP3.

Therefore, D3 where the third shift line SP3 and the fourth rotation shaft TM4 that is the output element cross is output.

[Fourth Forward Speed]

The second clutch C2 that was operated at the third forward speed D3 is released and the fourth clutch C4 is operated at the fourth forward speed D4.

In a state that the rotation speed of the input shaft IS is input to the third rotation shaft TM3 of the first planetary gear set PG1, the first rotation shaft TM1 is operated as the fixed element. Therefore, the reduced rotation speed is output through the second rotation shaft TM2.

At this time, the second and third planet carriers PC2 and PC3 are directly connected to each other and the second ring gear R2 is connected to the third sun gear S3 by operation of the first clutch C1.

At this state, the reduced rotation speed is output from the second rotation shaft TM2 and the rotation speed of the input shaft IS is input to the seventh rotation shaft TM7 through the third rotation shaft TM3 by operation of the fourth clutch C4. Therefore, the rotation elements of the second and third planetary gear sets PG2 and PG3 form a fourth shift line SP4.

Therefore, D4 where the fourth shift line SP4 and the fourth rotation shaft TM4 that is the output element cross is output.

[Fifth Forward Speed]

The fourth clutch C4 that was operated at the fourth forward speed D4 is released and the third clutch C3 is operated at the fifth forward speed D5.

In a state that the rotation speed of the input shaft IS is input to the third rotation shaft TM3 of the first planetary gear set PG1, the first rotation shaft TM1 is operated as the fixed element. Therefore, the reduced rotation speed is output through the second rotation shaft TM2.

At this time, the second and third planet carriers PC2 and PC3 are directly connected to each other and the second ring gear R2 is connected to the third sun gear S3 by operation of the first clutch C1.

At this state, the reduced rotation speed is output from the second rotation shaft TM2 and the rotation speed of the input shaft IS is input to the fifth rotation shaft TM5 by operation of the third clutch C3. Therefore, the rotation elements of the second and third planetary gear sets PG2 and PG3 form a fifth shift line SP5.

Therefore, D5 where the fifth shift line SP5 and the fourth rotation shaft TM4 that is the output element cross is output.

[Sixth Forward Speed]

The first clutch C1 that was operated at the fifth forward speed D5 is released and the fourth clutch C4 is operated at the sixth forward speed D6.

The rotation speed of the input shaft IS is input to the fifth rotation shaft TM5 by operation of the third clutch C3 and the rotation speed of the input shaft IS is input to the seventh rotation shaft TM7 through the third rotation shaft TM3 by operation of the fourth clutch C4 such that the third planetary gear set PG3 becomes a direct-coupling state. Therefore, the rotation elements of the third planetary gear set PG3 form a sixth shift line SP6.

Therefore, D6 where the sixth shift line SP6 and the fourth rotation shaft TM4 that is the output element cross is output.

[Seventh Forward Speed]

The fourth clutch C4 that was operated at the sixth forward speed D6 is released and the second clutch C2 is operated at the seventh forward speed D7.

In a state that the rotation speed of the input shaft IS is input to the third rotation shaft TM3 of the first planetary gear set PG1, the first rotation shaft TM1 is operated as the fixed element. Therefore, the reduced rotation speed is output through the second rotation shaft TM2.

The rotation speed of the input shaft IS is input to the fifth rotation shaft TM5 by operation of the third clutch C3 and the reduced rotation speed of the second rotation shaft TM2 is input to the seventh rotation shaft TM7 by operation of the second clutch C2. Therefore, the rotation elements of the third planetary gear set PG3 form a seventh shift line SP7.

Therefore, D7 where the seventh shift line SP7 and the fourth rotation shaft TM4 that is the output element cross is output.

[Eighth Forward Speed]

The second clutch C2 that was operated at the seventh forward speed D7 is released and the second brake B2 is operated at the eighth forward speed D8.

The rotation speed of the input shaft IS is input to the fifth rotation shaft TM5 by operation of the third clutch C3 and the seventh rotation shaft TM7 is operated as the fixed element by operation of the second brake B2. Therefore, the rotation elements of the third planetary gear set PG3 form an eighth shift line SP8.

Therefore, D8 where the eighth shift line SP8 and the fourth rotation shaft TM4 that is the output element cross is output.

[First Reverse Speed]

The second clutch C2 and the first brake B1 are operated at the first reverse speed REV1.

In a state that the rotation speed of the input shaft IS is input to the third rotation shaft TM3 of the first planetary gear set PG1, the first rotation shaft TM1 is operated as the fixed element. Therefore, the reduced rotation speed is output through the second rotation shaft TM2.

The reduced rotation speed of the second rotation shaft TM2 is input to the seventh rotation shaft TM7 of the third planetary gear set PG3 by operation of the second clutch C2 and the fifth rotation shaft TM5 is operated as the fixed element by operation of the first brake B1. Therefore, the rotation elements of the third planetary gear set PG3 form a first reverse shift line SR1.

Therefore, REV1 where the first reverse shift line SR1 and the fourth rotation shaft TM4 that is the output element cross is output.

[Second Reverse Speed]

The fourth clutch C4 and the first brake B1 are operated at the second reverse speed REV2.

The rotation speed of the input shaft IS is input to the seventh rotation shaft TM7 through the third rotation shaft TM3 by operation of the fourth clutch C4 and the fifth rotation shaft TM5 is operated as the fixed element by operation of the first brake B1. Therefore, the rotation elements of the third planetary gear set PG3 form a second reverse shift line SR2.

Therefore, REV2 where the second reverse shift line SR1 and the fourth rotation shaft TM4 that is the output element cross is output.

If the first clutch C1 is released at the sixth forward speed, the seventh forward speed, the eighth forward speed, the first reverse speed, and the second reverse speed, the second ring gear R2 is disconnected from the third sun gear S3. Therefore, the second and third planetary gear sets PG2 and PG3 are not direct-coupling state even though the rotation speed in input to two rotation elements. Therefore, above-described shifting processes are achieved.

As described above, eight forward speeds and two reverse speeds may be achieved by selectively connecting the rotation elements of three planetary gear sets PG1, PG2, and PG3 through four clutches C1, C2, C3, and C4 and two brakes B1 and B2 according to the exemplary embodiment of the present invention.

Therefore, power delivery efficiency and fuel economy may be improved and reverse speed performance may be also improved.

In addition, a layout of hydraulic lines may be simplified by dispersedly disposing the frictional elements, and capacity of a hydraulic pump may be reduced by operating two frictional elements at each shift-speed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train apparatus of an automatic transmission for a vehicle comprising:
    an input shaft receiving a torque of an engine;
    an output shaft outputting a changed torque;
    a first planetary gear set including first, second, and third rotation elements and disposed on the input shaft;
    a second planetary gear set including fourth, fifth, and sixth rotation elements and disposed on the input shaft;
    a third planetary gear set including seventh, eighth, and ninth rotation elements and disposed on the input shaft;
    a first rotation shaft directly connecting the first rotation element with a transmission housing;
    a second rotation shaft directly connecting the third rotation element with the fourth rotation element;
    a third rotation shaft directly connecting the second rotation element with the input shaft;
    a fourth rotation shaft directly connecting the ninth rotation element with the output shaft;

a fifth rotation shaft directly connecting the fifth rotation element with the eighth rotation element and selectively connected to the input shaft or the transmission housing;
a sixth rotation shaft connected to the sixth rotation element; and
a seventh rotation shaft connected to the seventh rotation element, and selectively connected to the second rotation shaft, the third rotation shaft, the sixth rotation shaft, or the transmission housing,
wherein the first planetary gear set is a double pinion planetary gear set, wherein the first rotation element is a first sun gear, the second rotation element is a first planet carrier, and the third rotation element is a first ring gear.

2. The gear train apparatus of claim 1, wherein the second planetary gear set is a single pinion planetary gear set, wherein the fourth rotation element is a second sun gear, the fifth rotation element is a second planet carrier, and the sixth rotation element is a second ring gear.

3. The gear train apparatus of claim 1, wherein the third planetary gear set is a single pinion planetary gear set, wherein the seventh rotation element is a third sun gear, the eighth rotation element is a third planet carrier, and the ninth rotation element is a third ring gear.

4. The gear train apparatus of claim 1, further comprising:
a first clutch selectively connecting the sixth rotation shaft with the seventh rotation shaft;
a second clutch selectively connecting the second rotation shaft with the seventh rotation shaft;
a third clutch selectively connecting the fifth rotation shaft with the input shaft;
a fourth clutch selectively connecting the third rotation shaft with the seventh rotation shaft;
a first brake selectively connecting the fifth rotation shaft with the transmission housing; and
a second brake selectively connecting the seventh rotation shaft with the transmission housing.

5. The gear train apparatus of claim 4,
wherein the first clutch is disposed between the second and third planetary gear sets,
wherein the first and second brakes are disposed at a radial outside of the first clutch,
wherein the second and fourth clutches are disposed at a radial outside of the first planetary gear set, and
wherein the third clutch is disposed between the third planetary gear set and the output shaft.

6. The gear train of claim 4, further comprising a one-way clutch disposed in parallel with the first brake.

7. The gear train apparatus of claim 4,
wherein the first clutch and the first brake are operated at a first forward speed,
wherein the first clutch and the second brake are operated at a second forward speed,
wherein the first clutch and the second clutch are operated at a third forward speed,
wherein the first clutch and the fourth clutch are operated at a fourth forward speed,
wherein the first clutch and the third clutch are operated at a fifth forward speed,
wherein the third clutch and the fourth clutch are operated at a sixth forward speed,
wherein the second clutch and the third clutch are operated at a seventh forward speed,
wherein the third clutch and the second brake are operated at an eighth forward speed,
wherein the second clutch and the first brake are operated at a first reverse speed, and
wherein the fourth clutch and the first brake are operated at a second reverse speed.

8. A gear train apparatus of an automatic transmission for a vehicle comprising:
an input shaft receiving a torque of an engine;
an output shaft outputting a changed torque;
a first planetary gear set including a first sun gear, a first planet carrier, and a first ring gear as rotation elements thereof;
a second planetary gear set including a second sun gear, a second planet carrier, and a second ring gear as rotation elements thereof; and
a third planetary gear set including a third sun gear, a third planet carrier, and a third ring gear as rotation elements thereof,
wherein the first sun gear is directly connected to a transmission housing, the first ring gear is directly connected to the second sun gear, the first planet carrier is directly connected to the input shaft, the third ring gear is directly connected to the output shaft, and the second planet carrier is directly connected to the third planet carrier,
wherein the third sun gear is selectively connected to the second ring gear, both of the second sun gear and the first ring gear that are directly connected to each other, the first planet carrier, or the transmission housing, and
wherein the third planet carrier is selectively connected to the input shaft or the transmission housing.

9. The gear train apparatus of claim 8, wherein the first planetary gear set is a double pinion planetary gear set and each of the second and third planetary gear sets is a single pinion planetary gear set.

10. The gear train apparatus of claim 8, further comprising:
a first clutch selectively connecting the third sun gear with the second ring gear;
a second clutch selectively connecting the third sun gear with both of the second sun gear and the first ring gear that are directly connected to each other;
a third clutch selectively connecting the third planet carrier with the input shaft;
a fourth clutch selectively connecting the third sun gear with the first planet carrier;
a first brake selectively connecting the third planet carrier with the transmission housing; and
a second brake selectively connecting the third sun gear with the transmission housing.

11. The gear train apparatus of claim 10, wherein the first clutch is disposed between the second and third planetary gear sets, the first and second brakes are disposed at a radial outside of the first clutch, the second and fourth clutches are disposed at a radial outside of the first planetary gear set, and the third clutch is disposed between the third planetary gear set and the output shaft.

12. The gear train apparatus of claim 10, further comprising a one-way clutch disposed in parallel with the first brake.

13. The gear train apparatus of claim 10,
wherein the first clutch and the first brake are operated at a first forward speed,
wherein the first clutch and the second brake are operated at a second forward speed,
wherein the first clutch and the second clutch are operated at a third forward speed,
wherein the first clutch and the fourth clutch are operated at a fourth forward speed,
wherein the first clutch and the third clutch are operated at a fifth forward speed,
wherein the third clutch and the fourth clutch are operated at a sixth forward speed, wherein the second clutch and the third clutch are operated at a seventh forward speed, wherein the third clutch and the second brake are operated at an eighth forward speed, wherein the second clutch and the first brake are operated at a first reverse speed, and wherein the fourth clutch and the first brake are operated at a second reverse speed.

14. A gear train apparatus of an automatic transmission for a vehicle comprising:

an input shaft receiving a torque of an engine;

an output shaft outputting a changed torque;

a first planetary gear set including first, second, and third rotation elements and disposed on the input shaft;

a second planetary gear set including fourth, fifth, and sixth rotation elements and disposed on the input shaft;

a third planetary gear set including seventh, eighth, and ninth rotation elements and disposed on the input shaft;

a first rotation shaft directly connecting the first rotation element with a transmission housing;

a second rotation shaft directly connecting the third rotation element with the fourth rotation element;

a third rotation shaft directly connecting the second rotation element with the input shaft;

a fourth rotation shaft directly connecting the ninth rotation element with the output shaft;

a fifth rotation shaft directly connecting the fifth rotation element with the eighth rotation element and selectively connected to the input shaft or the transmission housing;

a sixth rotation shaft connected to the sixth rotation element;

a seventh rotation shaft connected to the seventh rotation element, and selectively connected to the second rotation shaft, the third rotation shaft, the sixth rotation shaft, or the transmission housing;

a first clutch selectively connecting the sixth rotation shaft with the seventh rotation shaft;

a second clutch selectively connecting the second rotation shaft with the seventh rotation shaft;

a third clutch selectively connecting the fifth rotation shaft with the input shaft;

a fourth clutch selectively connecting the third rotation shaft with the seventh rotation shaft;

a first brake selectively connecting the fifth rotation shaft with the transmission housing; and a second brake selectively connecting the seventh rotation shaft with the transmission housing.

15. The gear train apparatus of claim 14, wherein the first clutch is disposed between the second and third planetary gear sets, wherein the first and second brakes are disposed at a radial outside of the first clutch, wherein the second and fourth clutches are disposed at a radial outside of the first planetary gear set, and wherein the third clutch is disposed between the third planetary gear set and the output shaft.

16. The gear train of claim 14, further comprising a one-way clutch disposed in parallel with the first brake.

17. The gear train apparatus of claim 14, wherein the first clutch and the first brake are operated at a first forward speed, wherein the first clutch and the second brake are operated at a second forward speed, wherein the first clutch and the second clutch are operated at a third forward speed, wherein the first clutch and the fourth clutch are operated at a fourth forward speed, wherein the first clutch and the third clutch are operated at a fifth forward speed, wherein the third clutch and the fourth clutch are operated at a sixth forward speed, wherein the second clutch and the third clutch are operated at a seventh forward speed, wherein the third clutch and the second brake are operated at an eighth forward speed, wherein the second clutch and the first brake are operated at a first reverse speed, and wherein the fourth clutch and the first brake are operated at a second reverse speed.

* * * * *